H. RIDDLE.
DEVICE FOR PREVENTING THE DERAILING OF RAILWAY CARS.
APPLICATION FILED MAY 21, 1913.
1,072,261.
Patented Sept. 2, 1913.
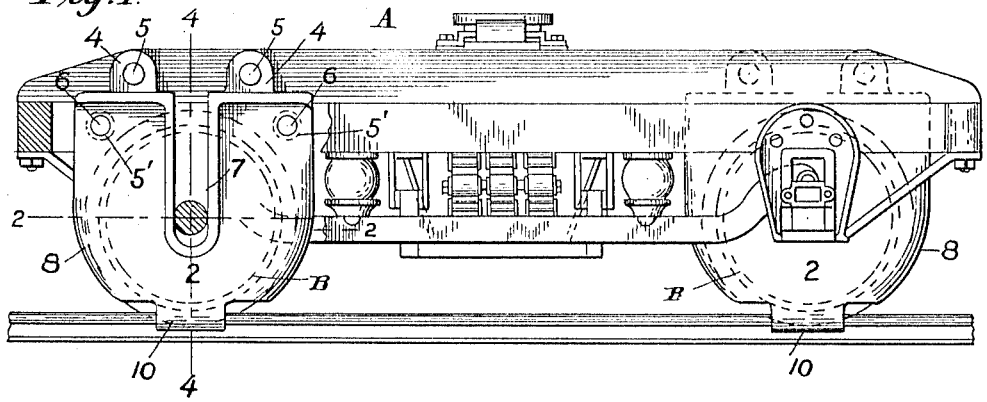
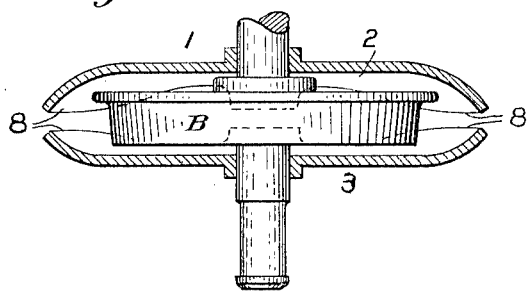
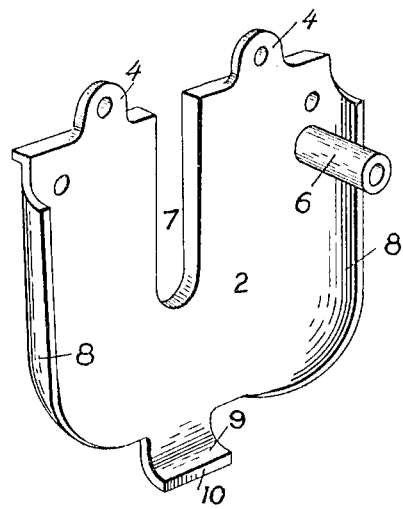
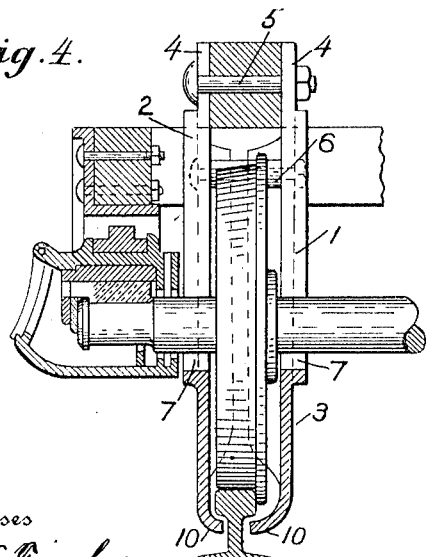
Witnesses
Geo. E. Frick
James A. Koehl
Inventor
Henry Riddle
By Victor J. Evans
Attorney

UNITED STATES PATENT OFFICE.

HENRY RIDDLE, OF NORTH LIBERTY, IOWA, ASSIGNOR OF ONE-THIRD TO FRANK RIDDLE, ONE-THIRD TO JAMES RIDDLE, AND ONE-THIRD TO EMIL RIDDLE, ALL OF NORTH LIBERTY, IOWA.

DEVICE FOR PREVENTING THE DERAILING OF RAILWAY-CARS.

1,072,261.     Specification of Letters Patent.     Patented Sept. 2, 1913.

Application filed May 21, 1913. Serial No. 769,048.

*To all whom it may concern:*

Be it known that I, HENRY RIDDLE, a citizen of the United States, residing at North Liberty, in the county of Johnson and State of Iowa, have invented new and useful Improvements in Devices for Preventing the Derailing of Railway-Cars, of which the following is a specification.

This invention relates to devices for preventing the derailing of railway cars; and it has for its primary object the provision of a device of this character which may be applied to the truck and which will embody companion guard plates lying at the opposite sides of the wheels and terminating in lower surfaces underlying the ball portions of the rails of a track structure and adapted to be operatively advanced thereagainst on any tendency of the track to rise and thereby positively prevent the truck from leaving the rails.

A further object of the invention is the provision of guard plates which may be projected over and beyond the tread portions of the wheels, so as to prevent objects on the track from being brought into direct contact with the wheels when the car is in motion.

With these and other objects in view, the invention consists of certain novel features of construction, combination and arrangement of parts, as will be hereinafter described and claimed.

In the accompanying drawings:—Figure 1 is a side view of the track, showing the application of the invention thereto; Fig. 2 is a horizontal section on line 2—2 of Fig. 1; Fig. 3 is a perspective view of one of the guard devices removed from the truck; and Fig. 4 is a section on line 4—4 of Fig. 1.

The truck A herein conventionally illustrated is provided with the usual supporting wheels B each being equipped with a guard 1 embodying inner and outer plates 2 and 3 lying at the opposite sides of the wheel and being substantially vertically disposed relatively thereof and provided with upper attaching brackets 4 by means of which the device may be bolted, as at 5, to the truck. The guard for each wheel is identical in construction, and as illustrated the plates 2 and 3 are separated from each other by horizontal spacing sleeves 5', through which bolts 6 may be extended and clamped against the outer surfaces of the plates so as to hold the latter in proper spaced relation. The inner plate 2 is provided with a vertical slot 7, through which the axle is extended, the slot being relatively long so as to compensate for relative vertical movements of the truck and axle, respectively. The plates are substantially of V-form in plan and at the ends they are curved, as at 8, so as to partly project over the adjacent tread surfaces of the wheel to form protecting means to prevent objects on the truck from being brought into direct engagement with the wheel while the car is in motion. At the lower ends, the plates are provided with relatively narrow extensions 9 having angularly bent flanges 10, which are adapted to underlie the ball of the rail, as shown in Fig. 4, the said flanges being normally spaced slightly from the ball, so as to compensate for the vertical rise of the truck under ordinary condition.

From this construction it is seen that when the wheels of the truck are equipped with guards such as those described, the flanges 10 will serve to limit the vertical rise of the truck and positively prevent accidental derailment of the car while the latter is in motion.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

1. A safety attachment for cars, comprising relatively spaced plates lying at the opposite sides of the wheel of the truck and secured to the truck and provided with terminal portions lying below the axis of the wheel and underlying the ball of the rail.

2. A safety attachment for cars comprising companion plates secured to the truck and lying against the opposite sides of the wheel, one of the plates having a vertical slot therein receiving the axle therethrough to compensate for relative vertical movement of the axle and truck respectively and flanges formed on the plates beneath the axle and underlying the ball of the rail.

3. A safety attachment for cars comprising plates secured to the truck and lying at the opposite sides of the wheel, spacing sleeves between the plates, bolts passing through the sleeves and through the plates, and flanges formed on the plates below the axis of the wheel and underlying the ball of the rail.

4. A safety attachment for cars comprising plates secured to the truck and lying at the opposite sides of the wheel and provided with curved ends extending over the tread surfaces of the wheel and partly housing said surfaces and flanges formed on the plates and underlying the ball of the rail.

In testimony whereof I affix my signature in presence of two witnesses.

HENRY RIDDLE.

Witnesses:
SAMUEL E. LEHNEN,
W. D. STEWART.